(12) United States Patent
Liu et al.

(10) Patent No.: US 8,018,091 B2
(45) Date of Patent: Sep. 13, 2011

(54) POWER-MODE SELECTABLE BACKUP POWER SUPPLY

(75) Inventors: Huang-Chu Liu, Caotun Township, Nantou County (TW); Chun-Ta Wu, Jhuci Township, Chiayi County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 170 days.

(21) Appl. No.: 12/076,455

(22) Filed: Mar. 19, 2008

(65) Prior Publication Data

US 2009/0236914 A1    Sep. 24, 2009

(51) Int. Cl.
*H02J 9/00* (2006.01)

(52) U.S. Cl. ............... 307/66; 307/43; 307/64; 307/65; 307/69; 307/70; 307/71; 307/77; 307/80; 307/85; 307/86

(58) Field of Classification Search .............. 307/66, 307/43, 64, 65, 69, 71, 77, 80, 85, 86
See application file for complete search history.

(56) References Cited

U.S. PATENT DOCUMENTS

| | | | | |
|---|---|---|---|---|
| 4,612,492 A * | 9/1986 | Burk | | 320/103 |
| 5,148,042 A * | 9/1992 | Nakazoe | | 307/60 |
| 5,572,110 A * | 11/1996 | Dunstan | | 320/106 |
| 5,596,512 A * | 1/1997 | Wong et al. | | 702/63 |
| 5,859,481 A * | 1/1999 | Banyas | | 307/64 |
| 5,905,365 A * | 5/1999 | Yeh | | 320/166 |
| 5,944,828 A * | 8/1999 | Matsuoka | | 713/323 |
| 6,016,045 A * | 1/2000 | Thomas et al. | | 320/107 |
| 7,131,011 B2 * | 10/2006 | Westerinen et al. | | 713/300 |
| 2004/0176146 A1 * | 9/2004 | Kim | | 455/572 |
| 2005/0213392 A1 * | 9/2005 | Ganton | | 365/185.29 |
| 2006/0173595 A1 * | 8/2006 | Ma et al. | | 701/36 |
| 2007/0040449 A1 * | 2/2007 | Spurlin et al. | | 307/64 |
| 2007/0278861 A1 * | 12/2007 | Lou et al. | | 307/66 |
| 2008/0106150 A1 * | 5/2008 | Chamberlain et al. | | 307/66 |

* cited by examiner

*Primary Examiner* — Jared J Fureman
*Assistant Examiner* — Justen Fauth
(74) *Attorney, Agent, or Firm* — Rosenberg, Klein & Lee

(57) ABSTRACT

A selectable backup power supply device for providing power to a real time clock (RTC) and a memory unit is disclosed. The device includes a backup battery, a first power outputting unit and a second power outputting unit, wherein the backup battery outputs a backup voltage, the first power outputting unit is connected to the backup battery and the RTC for receiving the backup voltage and outputting a first supply voltage to the RTC, and the second power outputting unit is connected to the backup battery and the memory unit, for receiving the backup voltage and, in accordance with a selection signal, outputting a second supply voltage to the memory unit or stopping the output of the second supply voltage.

9 Claims, 2 Drawing Sheets

POWER-MODE SELECTABLE BACKUP POWER SUPPLY

BACKGROUND OF THE INVENTION

1. Field of the Invention

The present application is related to a backup power supply, and more particularly to a backup power supply device which is suitable for being used in a handheld PC, and which has different selectable modes for providing propriate electricity to the handheld PC.

2. Description of Related Art

Generally, when the handheld PC is under a low battery situation, a standard mode or a premium mode is always adopted for managing the power system. In the standard mode, when the electricity of the main battery is exhausted or is removed, the data of the handheld PC will automatically be stored in the memory and the backup battery will provide power to the memory and the real time clock (RTC) for at least 30 minutes so as to maintain the data and also the time. Moreover, in the premium mode, the backup battery only provides power to the RTC so as to maintain the time information for about 168 hours.

Please refer to FIG. 1, which is a schematic view showing the conventional power supply device in the handheld PC. The power supply device 1 includes a main battery 14, a charging unit 19, a backup battery 18 and a power outputting unit 16. When the handheld PC is under a normal power supply situation, the main battery 14 provides voltage to a RTC 2 and a memory unit 3 and, at the same time, charges the backup battery 18 through the charging unit 19. Here, the memory unit 3 is usually a SDRAM (Synchronous Dynamic Random Access Memory).

However, the power supply device 1 as shown in FIG. 1 only can be used in the standard mode. When the electricity of the main battery is consumed or the main battery is removed, the handheld PC is changed to be supplied by the backup battery 18. At this time, the backup battery 18 outputs backup voltage to the power outputting unit 16, so that the power outputting unit 16 can provide voltage to the RTC 2 and the memory unit 3. Here, the power provided by the backup battery 18 is used for maintaining the integration of data, including data in editing, program under using and other set values. Besides, the RTC 2 can maintain the time information of the handheld PC.

Besides, since the backup battery 18 has to provide power to RTC 2 and memory unit 3 at the same time, the power only can maintain the system for about 30 to 90 minutes, and after the power is consumed, the data stored in the memory unit 3 will disappear.

Therefore, the conventional power supply device 1 can not provide the user the selection between standard mode and premium mode, so that only the standard mode can be provided for managing power, in which the provided power actually is insufficient in maintaining a long term operation of memory unit 3 and RTC 2.

SUMMARY OF THE INVENTION

Consequently, the present application provides a selectable backup power supply device used in a handheld PC which can provide two selectable kinds of power managing means, standard mode and premium mode, to the handheld PC under a low battery situation.

The present application provides a selectable backup power supply device for providing power to a real time clock (RTC) and a memory unit. The device includes a backup battery, a first power outputting unit and a second power outputting unit, wherein the backup battery outputs a backup voltage, the first power outputting unit is connected to the backup battery and the RTC for receiving the backup voltage and outputting a first supply voltage to the RTC, and the second power outputting unit is connected to the backup battery and the memory unit, for receiving the backup voltage and, in accordance with a selection signal, outputting a second supply voltage to the memory unit or stopping the output of the second supply voltage.

Accordingly, according to the present application, when the handheld PC is under the low battery situation, in accordance with the selection signal, the second supply voltage can be outputted to the memory unit for achieving the standard mode power management, or the output of the second supply voltage can be stopped for selecting the premium mode power management.

BRIEF DESCRIPTION OF THE DRAWINGS

The foregoing aspects and many of the attendant advantages of this application will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
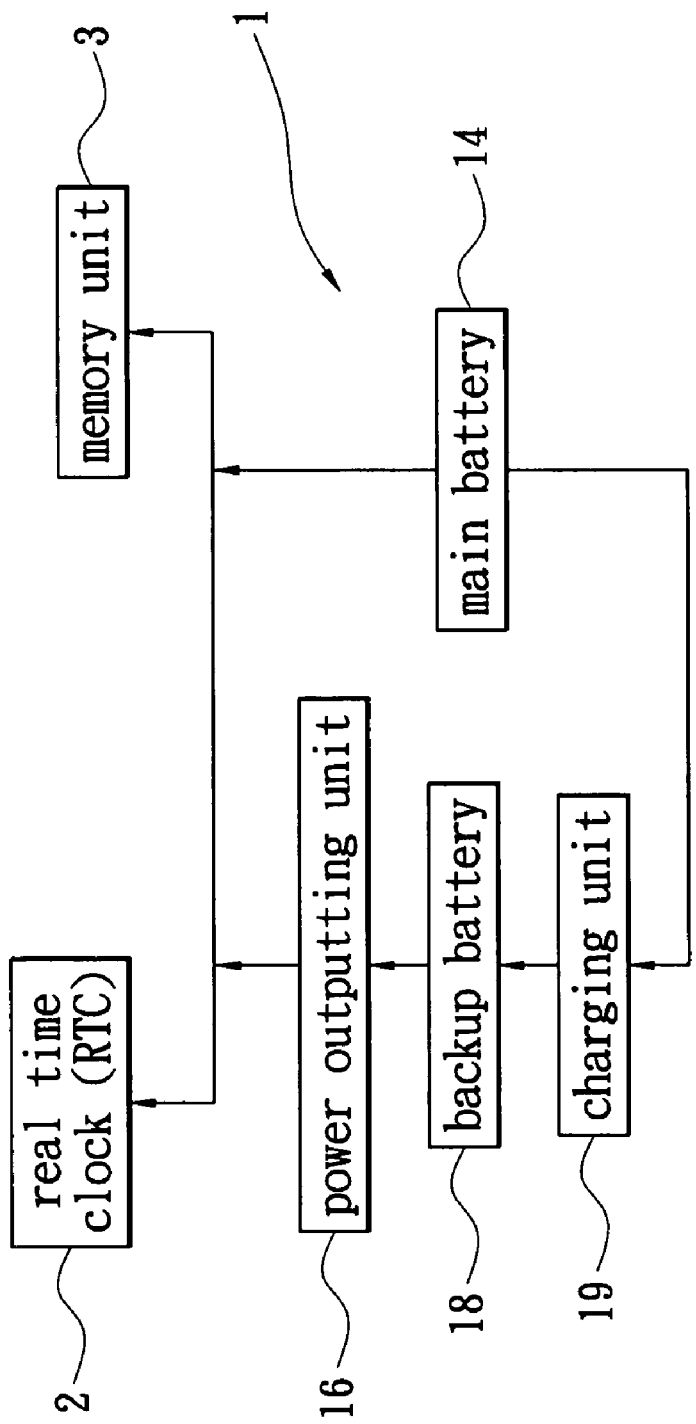
FIG. 1 is a schematic view showing the conventional power supply device of the handheld PC.
Figure 2:
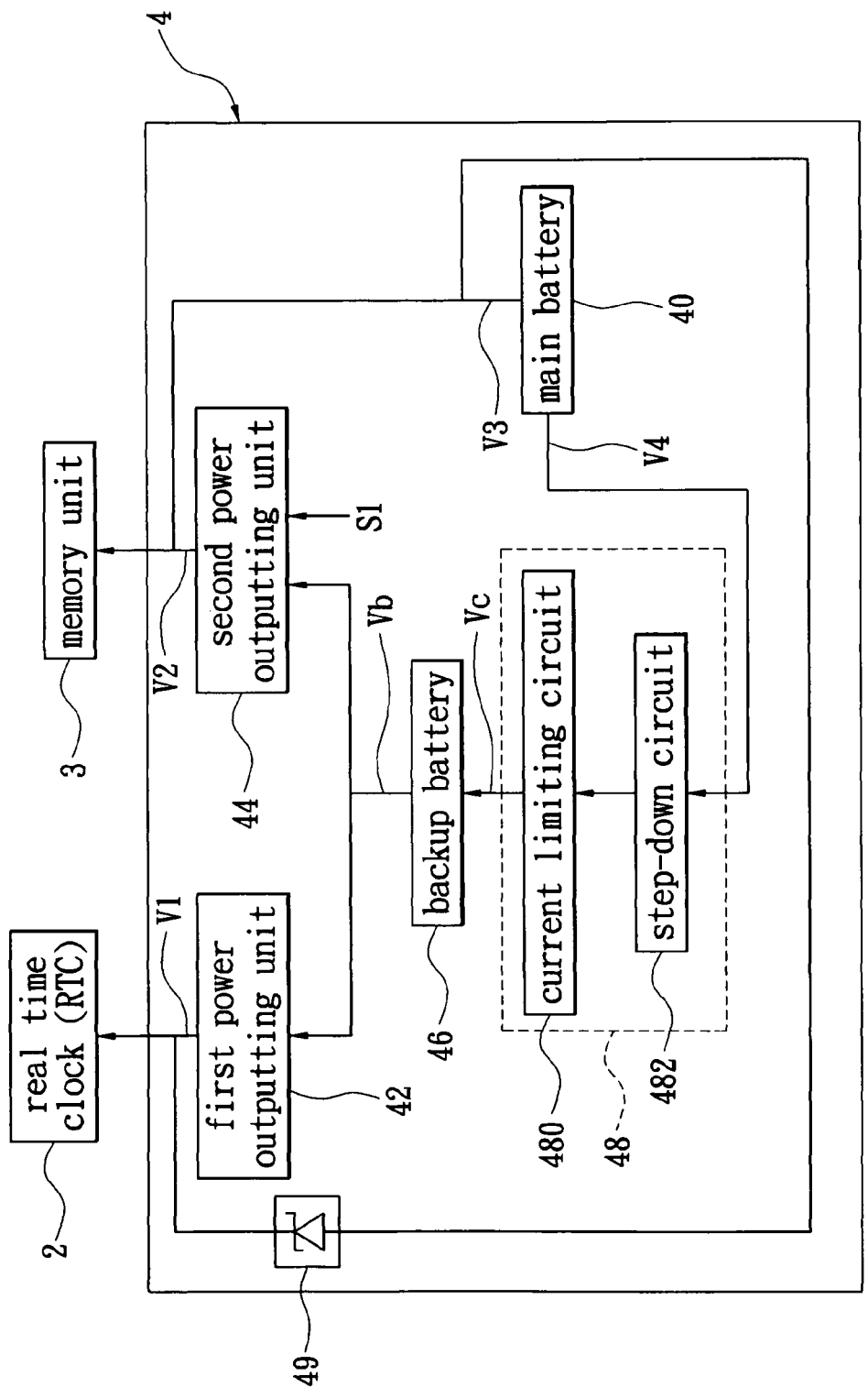
FIG. 2 is a circuit diagram showing a selectable backup power supply device according to the present application.

Please refer to FIG. 2, which is a circuit diagram showing the selectable power supply device according to the present application. The selectable backup power supply device 4 is suitable for being used in a handheld PC. The selectable backup power supply device 4 is connected to a RTC 2 and a memory unit 3 and can provide power to RTC 2 and memory unit 3 in accordance with a selection signal S1. Here, the memory unit 3 can be a SDRAM (Synchronous Dynamic Random Access Memory).

The selectable backup power supply device 4 includes a backup battery 46, a first power outputting unit 42 and a second power outputting unit 44, wherein the backup battery 46 is used to output a backup voltage Vb, the first power outputting unit 42 is connected to the backup battery 46 and RTC 2 for receiving the backup voltage Vb and outputting a first supply voltage V1 to RTC 2, and the second power outputting unit 44 is connected to the backup battery 46 and the memory unit 3 for receiving the backup voltage Vb and, in accordance with the selection signal S1, outputting a second supply voltage V2 to the memory unit 3 or stopping the output of the second supply voltage V2.

The first power output unit 42 provides an over-discharge protection for preventing its over-discharging by the backup voltage Vb, and also provides a function of power generation, so as to produce the first supply voltage V1 in accordance with the backup voltage Vb. Identically, the second power outputting unit 44 also provides an over-discharge protection for preventing its over-discharging by the backup voltage Vb and provides the function of power generation, so as to produce the second supply voltage V2 in accordance with the backup voltage Vb.

Again, please refer to FIG. 2. The selectable backup power supply device 4 further includes a charging unit 48 and a main battery 40. The charging unit 40 is connected to the backup battery 46 and the main battery 40, for receiving a second main voltage V4 from the main battery 40 and outputting a charging voltage Vc to charge the backup battery 46. Moreover, the main battery 40 is further connected to the memory unit 3 for outputting a first main voltage V3 thereto. The charging unit 48 has a step-down circuit 482 and a current limiting circuit 480, wherein the step-down circuit 482 is connected to the main battery 40 for stepping down the second main voltage V4 so as to produce the charging voltage Vc, and the current limiting circuit 480 is connected to the step-down circuit 482 for limiting the magnitude of the charging current.

The selectable backup power supply device 4 further includes a voltage clamp 49, connected to the main battery 40 and the first voltage outputting unit 42, for clamping the output of the first supply voltage V1. Here, the voltage clamp 49 can be a Zener diode. When the handheld PC is booted normally, the main battery 40 provides power to the memory unit 3 and to RTC 2 through the voltage clamp 49, and at the same time, to the backup battery 46 through the charging unit 48 for charging. Then, when the main battery 40 is under a low battery situation, RTC 2 obtains the first supply voltage V1 from the first power outputting unit 42 for maintaining operation thereof, and at the same time, the voltage clamp 49 clamps the first supply voltage V1 for providing stable power to RTC 2.

In accordance with the selection signal S1, the second power outputting unit 44 can output the second supply voltage V2 to the memory unit 3 for achieving the standard mode power management, or can stop the output of the second supply voltage V2 to the memory unit 3 for selecting the premium mode power management.

In the first situation, the user can set the selection signal S1 as "HIGH" (high potential), so that the selectable backup power supply device 4 will be under the standard mode. Therefore, when the main battery is consumed, the backup battery is initiated. After initiation, the power from the backup battery 46 outputs the backup voltage Vb to the first power outputting unit 42 and the second power outputting unit 44, for simultaneously supplying RTC 2 and memory unit 3.

Moreover, when the system detects that the electric capacity of the main battery 40 has dropped to a preset value, it will send out a Low Battery alarm and suspend the system. At this time, the reserved electric capacity of the main battery 40 is provided to the memory unit 3 which can maintain the memory unit 3 for about 72 hours. Therefore, the user can exchange or charge the main battery 40 within 72 hours since the system has been suspended (the exchange should be executed within 30 minutes ever since the backup battery 46 is consumed).

After exchanging or charging the main battery 40, the user may re-press the power button for recovering the handheld PC to the condition prior to being suspended since the memory unit 3 has been constantly supplied.

In the standard mode, the backup battery 46 provides power to RTC 2, and simultaneously the main battery 40 provides power to the memory unit 3, so that the supplied power is only sufficient to maintain the operation of RTC 2 and memory unit 3 for about 30 to 90 minutes. In this duration, the data, including data in editing, program under using and other set values, produced by the handheld PC is stored in the memory unit 3, and RTC 2 maintains the time information of the handheld PC. Here, since the memory unit 3 is a SDRAM, the data stored therein will disappear after the power of the main battery 40 and the backup battery 46 is consumed.

In the second situation, the user can set the selection signal S1 as "LOW" (low potential), so that the selectable backup power supply device 4 will be under the premium mode. When the main battery is consumed, the backup battery is initiated.

After initiation, the power from the backup battery 46 outputs the backup voltage Vb to the first power outputting unit 42 for supplying RTC 2. In the premium mode, the second supply voltage V2 from the second power outputting unit 44 to the memory unit 3 will be stopped. Thus, in the premium mode, the backup battery 46 only needs to supply RTC 2, so that the time information of the handheld PC can be maintained for a long time, about 168 hours.

Moreover, when the system detects that the electric capacity of the main battery 40 has dropped to a preset value, it will send out a Low Battery alarm but will not suspend the system. At this time, because the main battery 40 does not reserve the power, the user still can use the handheld PC. But, when the power is consumed, the whole system, including the memory unit 3, will lose power, so that the handheld PC will be shut down. After the main battery 40 is exchanged or charged and the provided voltage becomes high enough, the handheld PC will be restarted after re-pressing the power button.

In the aforesaid, according to the present application, when the handheld PC is under the low battery situation, in accordance with the selection signal, the second power outputting unit can output the second supply voltage to the memory unit for achieving the standard mode power management, or can stop the output of the second supply voltage for selecting the premium mode power management. Consequently, the present application provides two selections, standard mode and premium mode, for managing power as the handheld PC is under the low battery situation.

It is to be understood, however, that even though numerous characteristics and advantages of the present application have been set forth in the foregoing description, together with details of the structure and function of the application, the disclosure is illustrative only, and changes may be made in detail, especially in matters of shape, size, and arrangement of parts within the principles of the application to the full extent indicated by the broad general meaning of the terms in which the appended claims are expressed.

What is claimed is:

1. A selectable backup power supply device for providing power to a real time clock (RTC) and a volatile memory unit, when a main battery is at a predetermined voltage level, comprising:
   a backup battery, for outputting a backup voltage;
   a first power outputting unit, connected to the backup battery and the RTC, for receiving the backup voltage and outputting a first supply voltage to the RTC;
   a user selectable signal enabling a standard mode and premium mode power operation; and
   a second power outputting unit, connected to the backup battery and the volatile memory unit, for receiving the backup voltage and, in accordance with the selection signal, outputting a second supply voltage to the volatile memory unit or stopping the output of the second supply voltage to said volatile memory unit;
   wherein said standard mode comprises outputting said second supply voltage to said volatile memory unit and said RTC, and said premium mode comprises stopping output of said second supply voltage to said volatile memory unit while supplying said secondary supply voltage to said RTC.

2. The selectable backup power supply device as claimed in claim 1, further comprising a charging unit, connected to the backup battery, for outputting a charging voltage to charge the backup battery.

3. The selectable backup power supply device as claimed in claim 2, further comprising a main battery, connected to the memory unit and the charging unit, for outputting a first main voltage to the memory unit and outputting a second main voltage to the charging unit.

4. The selectable backup power supply device as claimed in claim 3, wherein the charging unit comprises:
 a step-down circuit, connected to the main battery, for stepping down the second main voltage so as to produce the charging voltage; and
 a current limiting circuit, connected to the step-down circuit, for limiting a charging current.

5. The selectable backup power supply device as claimed in claim 3, further comprising a voltage clamp, connected to the main battery and the first voltage outputting unit, for clamping the output of the first supply voltage.

6. The selectable backup power supply device as claimed in claim 5, wherein the voltage clamp is a Zener diode.

7. The selectable backup power supply device as claimed in claim 1, wherein the first power output unit provides an over-discharge protection for preventing over-discharge by the backup voltage, and also produces the first supply voltage.

8. The selectable backup power supply device as claimed in claim 1, wherein the second power output unit provides an over-discharge protection for preventing over-discharge by the backup voltage, and also produces the second supply voltage.

9. The selectable backup power supply device as claimed in claim 1, wherein the volatile memory unit is a synchronous dynamic random access memory (SDRAM).

* * * * *